(12) United States Patent  (10) Patent No.: US 8,089,002 B2
Hasegawa  (45) Date of Patent: Jan. 3, 2012

(54) CABLE INSERTION STRUCTURE FOR OUTBOARD MOTOR

(75) Inventor: Hiroyuki Hasegawa, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 436 days.

(21) Appl. No.: 12/489,460

(22) Filed: Jun. 23, 2009

(65) Prior Publication Data

US 2009/0314518 A1 Dec. 24, 2009

(30) Foreign Application Priority Data

Jun. 24, 2008 (JP) ................................. 2008-164990

(51) Int. Cl.
H02G 3/22 (2006.01)
H01B 17/58 (2006.01)

(52) U.S. Cl. ................ 174/153 G; 174/152 G; 174/650; 16/2.1; 16/2.2; 248/906

(58) Field of Classification Search .................. 174/650, 174/135, 152 G, 153 G, 152 R, 17 CT, 151, 174/142, 652, 668, 669; 16/2.1, 2.2; 439/604, 439/587, 274, 275; 248/56
See application file for complete search history.

(56) References Cited

U.S. PATENT DOCUMENTS

| 5,300,734 | A | * | 4/1994 | Suzuki ....................... 174/152 G |
| 5,337,447 | A | * | 8/1994 | Tanaka et al. .............. 174/153 G |
| 5,736,677 | A | * | 4/1998 | Sato et al. .................. 174/152 G |
| 5,981,877 | A | * | 11/1999 | Sakata et al. .............. 174/153 G |
| 6,088,874 | A | * | 7/2000 | Nakata et al. ............. 174/153 G |
| 6,901,627 | B2 | * | 6/2005 | Uchida ............................ 16/2.1 |

FOREIGN PATENT DOCUMENTS

JP 08-097574 A 4/1996

* cited by examiner

Primary Examiner — Angel R Estrada
(74) Attorney, Agent, or Firm — Keating & Bennett, LLP

(57) ABSTRACT

In a cable insertion structure for an outboard motor, a pawl section and a supporting section of a resinous cap are inserted from the inside of a cowling into a communicating hole of a rubber grommet, and the pawl section is fitted into a recess. Then, the communicating section of the rubber grommet is sandwiched between the pawl section and the pressing section, and thus the resinous cap is fixed to the rubber grommet. In the above-described state, a cable is inserted from an insertion hole of the resinous cap into a cable housing section of the rubber grommet. A clip band is fastened to a groove of the cable housing section to fix the cable housing section to the cable. The cable insertion structure for an outboard motor prevents a rubber grommet from coming off even when an external force that pulls the cable is applied.

5 Claims, 6 Drawing Sheets

CABLE INSERTION STRUCTURE FOR OUTBOARD MOTOR

BACKGROUND OF THE INVENTION

1. Field of the Invention

The present invention relates to a cable insertion structure for an outboard motor in which a cable is inserted through an outer casing of the outboard motor via a rubber grommet and which is suited for insertion of an electric cable in a cowling that covers an engine.

2. Description of the Related Art

In general, an outboard motor is provided with an engine in an upper portion thereof and is covered by a cover called a cowling. When, for example, an engine controller is disposed in the cowling, and the engine controller is connected to the outside of the cowling by an electric cable, an insertion structure in which the cable is inserted through the cowling is required. In such a case, a through hole is formed in the cowling, and the cable is inserted therethrough. However, the mere insertion of the cable in the through hole may cause water to enter from a clearance between the through hole and the cable. Thus, in JP-A-Hei 8-97574, a rubber grommet is fitted to the through hole, and a cable housing part, which is generally called a boot, tightly covers the periphery of the cable to prevent water immersion from the through hole.

However, when the rubber grommet is simply fitted to the through hole, the rubber grommet may come off the through hole by an external force that pulls the cable. Consequently, water enters from the through hole.

SUMMARY OF THE INVENTION

In view of the above problems, preferred embodiments of the present invention provide a cable insertion structure for an outboard motor that prevents a rubber grommet from coming off a through hole even when an external force that pulls a cable is applied and thus, prevent waters immersion via the through hole. As used herein, the term "rubber" should be construed to include natural or synthetic rubber or other suitable rubber-like material.

According to a preferred embodiment of the present invention, a cable insertion structure for an outboard motor in which a cable is inserted through an outer casing of the outboard motor via a rubber grommet has a resinous cap arranged to fix the rubber grommet to the outer casing. As used herein, the term "resinous" should be construed to include a resin or plastic material, or other suitable elastomeric material. The rubber grommet includes a communicating section that is tightly fitted to a through hole formed in the outer casing and that includes a communicating hole arranged to communicate with inner and outer surfaces of the outer casing; an inner collar section arranged to tightly abut on the inner surface of the outer casing around the through hole on both sides of the communicating section; and an outer collar section arranged to tightly abut on the outer surface of the outer casing around the through hole on both sides of the communicating section. The resinous cap includes a pressing section arranged to abut on the inner collar section of the rubber grommet; a supporting section that extends from the pressing section, that is tightly fitted in the communicating hole of the communicating section, and that includes an insertion hole through which the cable is inserted; and a pawl section that is located on an end of the support section in an extending direction and that arranged to sandwich the communicating section of the rubber grommet with the pressing section.

In this cable insertion structure for an outboard motor, the resinous cap preferably includes the pressing section arranged to abut on the inner collar section of the rubber grommet; the supporting section that is extended from the pressing section, that is tightly fitted to the communicating hole of the communicating section, and that includes the insertion hole through which the cable is inserted; and the pawl section that is located on the end of the supporting section in the extending direction and that arranged to sandwich the communicating section of the rubber grommet with the pressing section. The resinous cap is inserted in the communicating hole of the communicating section of the rubber grommet to fix the rubber grommet to the outer casing, and the cable is inserted through the insertion hole of the resinous cap. Accordingly, the inner collar section of the rubber grommet is pressed by the pressing section of the resinous cap while the communicating section of the rubber grommet is pressed against the inside of the through hole of the outer casing by the supporting section of the resinous cap. Therefore, it is possible to prevent the rubber grommet from coming off the through hole even when an external force that pulls the cable is applied, and thus to prevent water immersion via the through hole.

In the cable insertion structure for an outboard motor according to a preferred embodiment of the present invention, the communicating hole of the rubber grommet preferably is rectangular or nearly rectangular in the inner section profile while the supporting section of the rubber cap preferably has an ellipse shape in the outer section profile that is tightly fitted to at least the short side of the communicating hole.

In this cable insertion structure for an outboard motor, when the communicating hole of the rubber grommet is rectangular or nearly rectangular in the inner section profile, the supporting section of the resinous cap preferably has an ellipse shape that is tightly fitted to at least the short side of the through hole. Thus, it is possible to smoothly guide the cable generally with a round cross-section and to prevent deformation of the cable by efficiently abutting the communicating section of the rubber grommet on the inside of the through hole. Therefore, it is possible to reliably prevent the rubber grommet from coming off the through hole when the external force that pulls the cable is applied.

In the cable insertion structure for an outboard motor according to a preferred embodiment of the present invention, the pawl section is formed on the end of the ellipse-shaped supporting section in the long side in the extending direction.

In this cable insertion structure for an outboard motor, the pawl section is preferably provided on the end of the slot-shaped supporting section in the long side in the extending direction. Therefore, it is possible to increase the strength of the supporting section, especially a portion in the long side of the ellipse-shaped supporting section.

According to the cable insertion structure for an outboard motor of a preferred embodiment of the present invention, in order to insert the cable through the outer casing of the outboard motor via the rubber grommet, the rubber grommet preferably includes: the communicating section that is tightly fitted to the through hole formed in the outer casing and that includes the communicating hole that communicates with the inner and outer surfaces of the outer casing; the inner collar section that tightly abuts on the inner surface of the outer casing around the through hole on the both sides of the communicating section; and the outer collar section arranged to tightly abut on the outer surface of the outer casing around the through hole on the both sides of the communicating section. The resinous cap preferably includes the pressing section arranged to abut on the inner collar section of the rubber grommet; the supporting section that extends from the pressing section, that is tightly fitted into the communicating hole of the communicating section of the rubber grommet, and that includes the insertion hole through which the cable is inserted; and the pawl section that is located on the end of the supporting section in the extending direction and arranged to sandwich the communicating section of the rubber grommet with the pressing section. The resinous cap is inserted in the communicating hole of the communicating section of the rubber grommet to fix the rubber grommet to the outer casing, and the cable is inserted through the insertion hole of the resinous cap. Thus, the inner collar section of the rubber grommet is pressed by the pressing section of the resinous cap while the supporting section of the resinous cap presses the communicating section of the rubber grommet against the inside of the through hole of the outer casing. Therefore, it is possible to prevent the rubber grommet from coming off the through hole even when the external force that pulls the cable is applied, and thus to prevent water immersion via the through hole.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Preferred embodiments of a cable insertion structure for an outboard motor according to the present invention will hereinafter be described with reference to the drawings.

Figure 1:
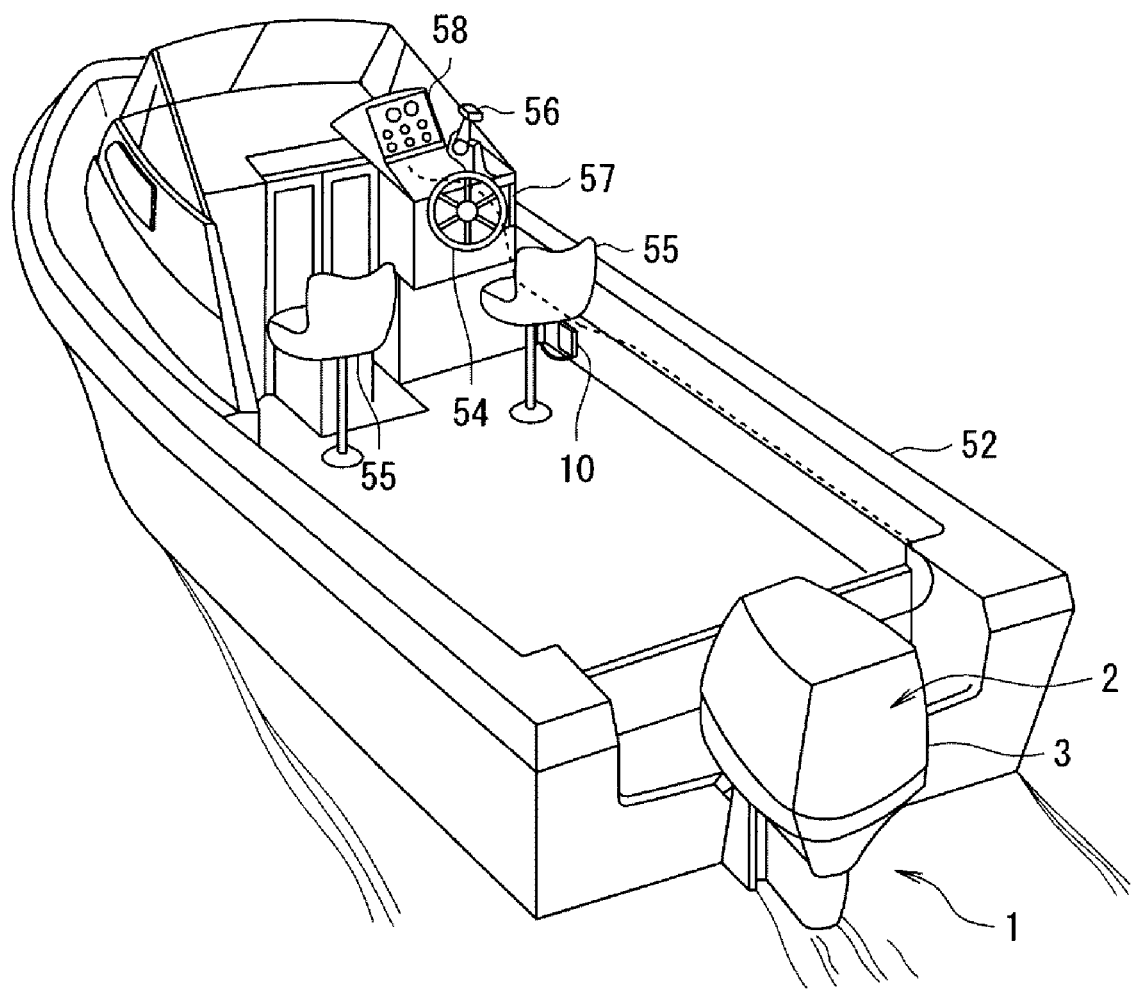
FIG. 1 is a schematic view of a preferred embodiment of a watercraft in which a cable insertion structure for an outboard motor is installed.

FIG. 1 is a schematic view of a watercraft to which a cowling structure for an outboard motor in this preferred embodiment is mounted. This watercraft has an outboard motor 1 that is mounted to the stern of an open-deck hull 52 and, at its front, includes a control compartment in which a steering wheel 54, seats 55, a remote control lever 56, a switch panel 57 that includes a main switch and a start switch, a meter panel 58, and the like are disposed. The outboard motor 1 includes therein an engine control unit to control an engine disposed in a cowling, which will be described later. Also, a remote control unit that is used to control the outboard motor 1 remotely is disposed in the switch panel 57, and the remote control unit is connected to the engine control unit by a cable. In addition, an immobilizer receiver 10 that receives an authentication code from a so-called transponder (transmitter or repeater) is mounted on a vertical or nearly vertical surface below the control compartment, which is a sidewall of a hull 52, and is connected to the remote control unit in the switch panel 57 by a cable.

Figure 2:
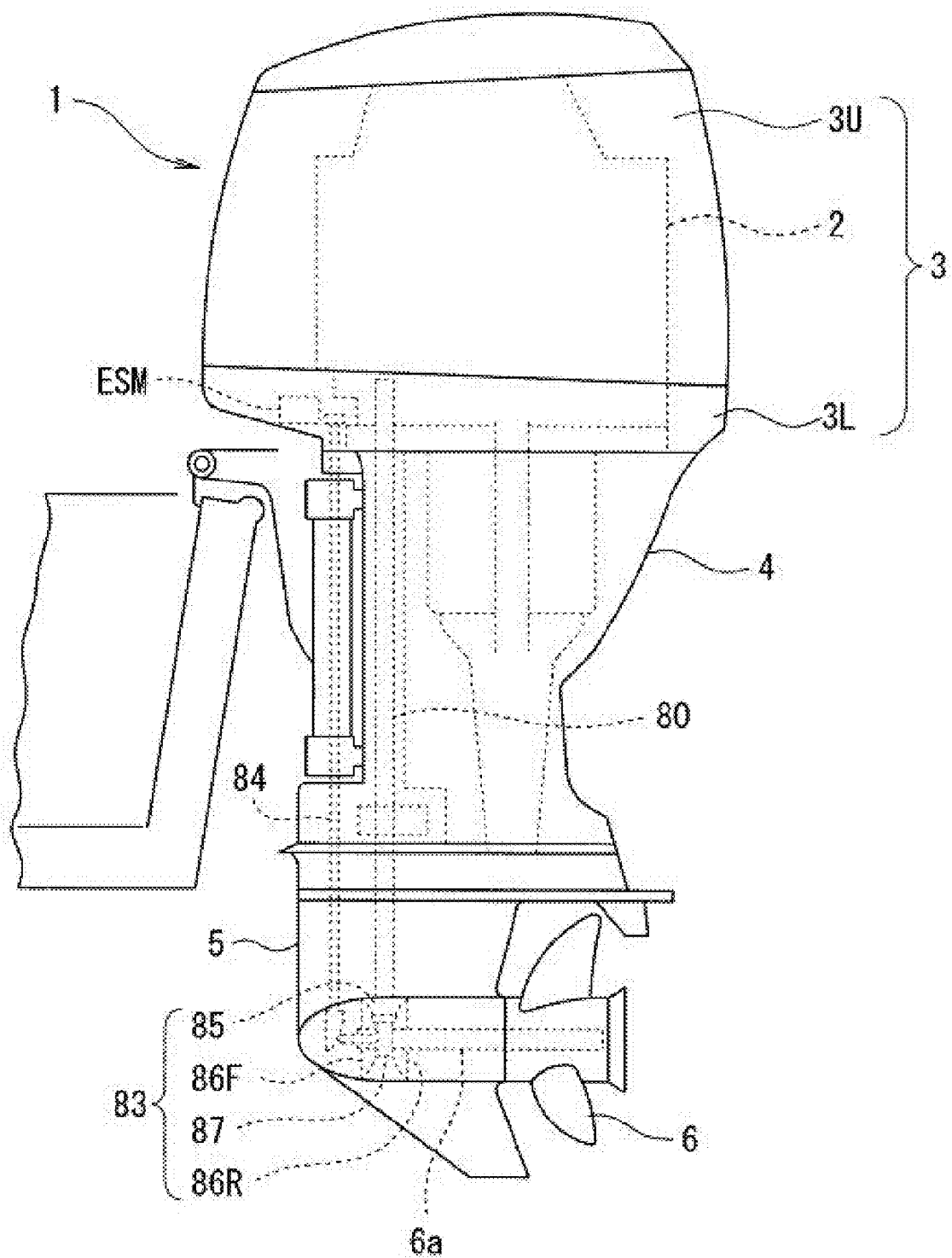
FIG. 2 is an external view of an outboard motor used for the watercraft in FIG. 1.

As shown in FIG. 2, the outboard motor 1 preferably includes a cowling 3, an upper case 4, and a lower case 5. The outboard motor 1 is mounted to the hull 52 by a clamp (not shown) for vertical and transverse pivotal movement relative to the hull 52. The cowling 3 preferably includes an upper cowling 3U and a lower cowling 3L and contains therein an engine 2.

A propeller shaft 6a as a rotary shaft of a propeller 6 is inserted in the lower case 5 in a horizontal direction. A drive shaft 80 that extends from the inside of the cowling 3 to the inside of the lower case 5 is connected at its lower end to the propeller shaft 6a via a shift change mechanism 83 that is constituted with a driver gear 85 including bevel gears, a forward gear 86F, a reverse gear 86R, and a dog clutch 87. Then, a shift rod 84 that is vertically disposed in parallel or substantially in parallel with the drive shaft 80 is rotated by an electrical rotary mechanism ESM that includes an electric motor controlled by an electrical controlled unit (not shown). Consequently, the shift change mechanism 83 is actuated to make a shift change to neutral, forward, or reverse, and the rotary force of the drive shaft 80 is subsequently transmitted to the propeller shaft 6a.

In other words, in the shift change mechanism 83, the forward gear 86F and the reverse gear 86R, both of which are rotatably disposed on the propeller shaft 6a, are engaged with the drive gear 85 that is fixed to the lower end of the drive shaft 80. The dog clutch 87, which is disposed on the propeller shaft 6a to be slidable but not rotatable relative thereto, is disposed between the forward gear 86F and the reverse gear 86R. In addition, the dog clutch 87 is slid on the propeller shaft 6a in conjunction with the rotation of the shift rod 84 (rotation of a cam surface at the lower end of the shift rod).

In the shift change mechanism 83 as described above, the shift rod 84 is rotated about its axis by the electrical rotary mechanism ESM, thereby moving the dog clutch 87 either for engagement with one of the forward gear 86F and the reverse gear 86R to transmit the rotation of the drive shaft 80 to the propeller shaft 6a via the respective gear, or to an intermediate position between the forward gear 86F and the reverse gear 86R to prevent engagement with any of the gears so that the outboard motor 1 is brought into a neutral state where the rotation of the drive shaft 80 is not transmitted to the drive shaft 6a.

A battery on the hull 52 is connected to the outboard motor 1 via a battery switch (not shown) and a battery cable (not shown), and power from the battery is supplied to electrical components and the engine control unit of the outboard motor 1. In addition, the outboard motor 1 is connected to the hull 52 by a remote control cable and a throttle shift cable. In this preferred embodiment, the engine control unit for the outboard motor 1 is installed in the outboard motor 1 and connected to the remote control unit in the switch panel 57 by the remote control cable. As described above, the remote control unit in the switch panel 57 is connected to the immobilizer receiver 10. Therefore, various changes can be made in the specification after code authentication by transmitting the authentication result of the authentication code, which is produced by the immobilizer receiver 10, to the engine control unit. In this preferred embodiment, the activation of the engine 2 in the outboard motor 1 is permitted when the authentication code is authenticated by the immobilizer receiver 10. In addition, the engine 2 is activated only when the switch panel 57 outputs an engine activation command after the authentication of the code. The specification after the authentication of the code is not limited to the above, and may include use of the battery switch or cancellation of a shift lock of the shift change mechanism.

Figure 3:
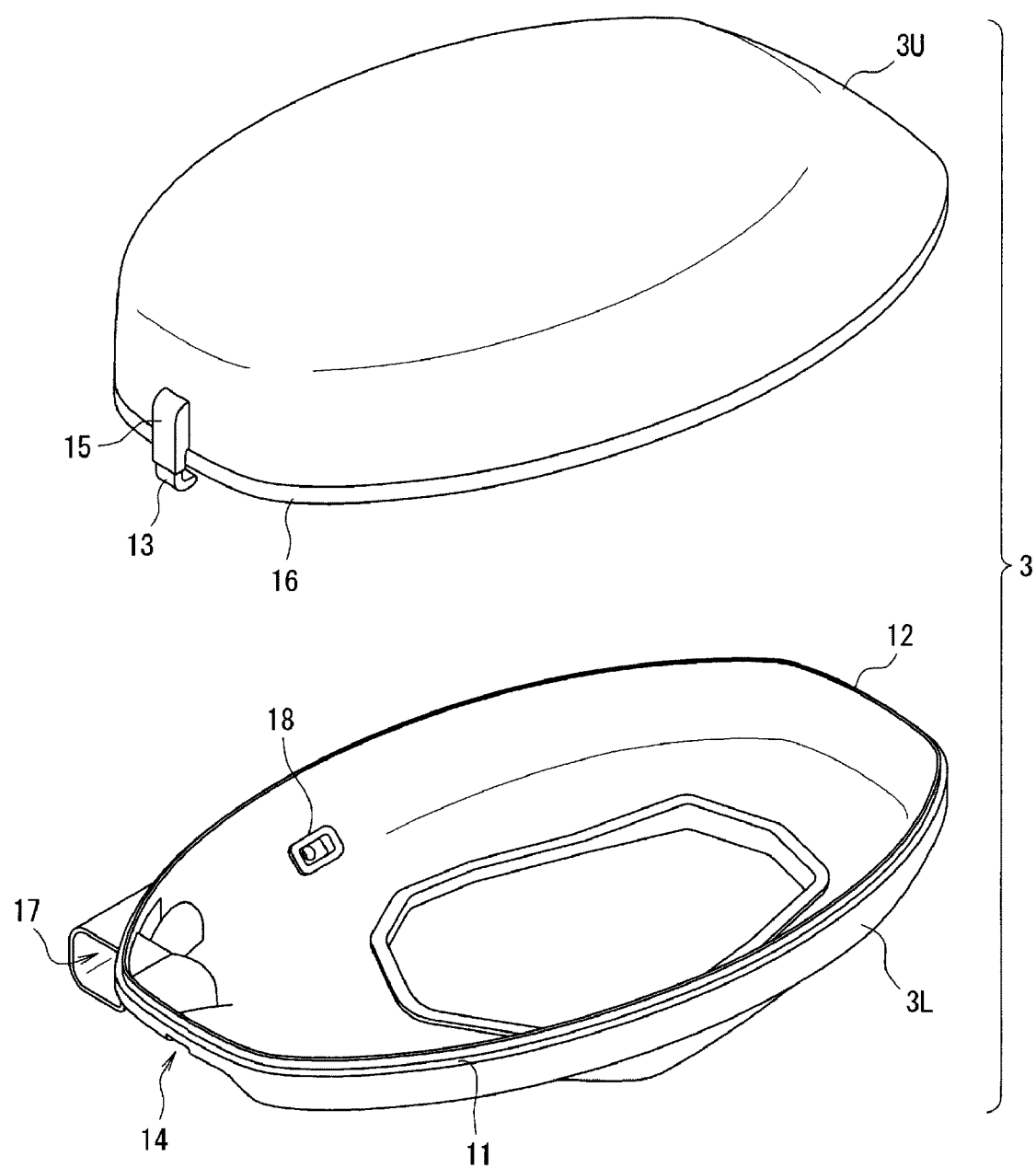
FIG. 3 is a perspective view of a cowling of the outboard motor in FIG. 2.

FIG. 3 shows a perspective view of the upper cowling 3U and the lower cowling 3L. The reference numeral 11 in the drawing denotes the upper-cowling joining surface of the lower cowling 3L. The lower cowling 3L does not have a notch on its upper edge. A sealing member 16 that is covered on an entire lower edge of the upper cowling 3U is interposed between the upper cowling 3U and the lower cowling 3L. The sealing property or liquid tight property between the upper cowling 3U and the lower cowling 3L is secured by the sealing member 16 extending on the entire edge and by the upper-cowling joining surface without a notch. A support edge 12 that supports a lower edge of the upper cowling 3U from inside is disposed on the inside of the upper-cowling joining surface 11.

The upper cowling 3U is fixed to the lower cowling 3L in the front portion of the cowling by a hook structure. In the hook structure, the upper cowling 3U is adapted to be fixed to the lower cowling 3L such that a hook 13 attached to the outside of the front portion of the upper cowling 3U is hooked to a hook receiving section 14 provided in the lower cowling 3L. The reference numeral 17 in the drawing denotes a through hole for connection of cables from the control compartment.

Figure 4:
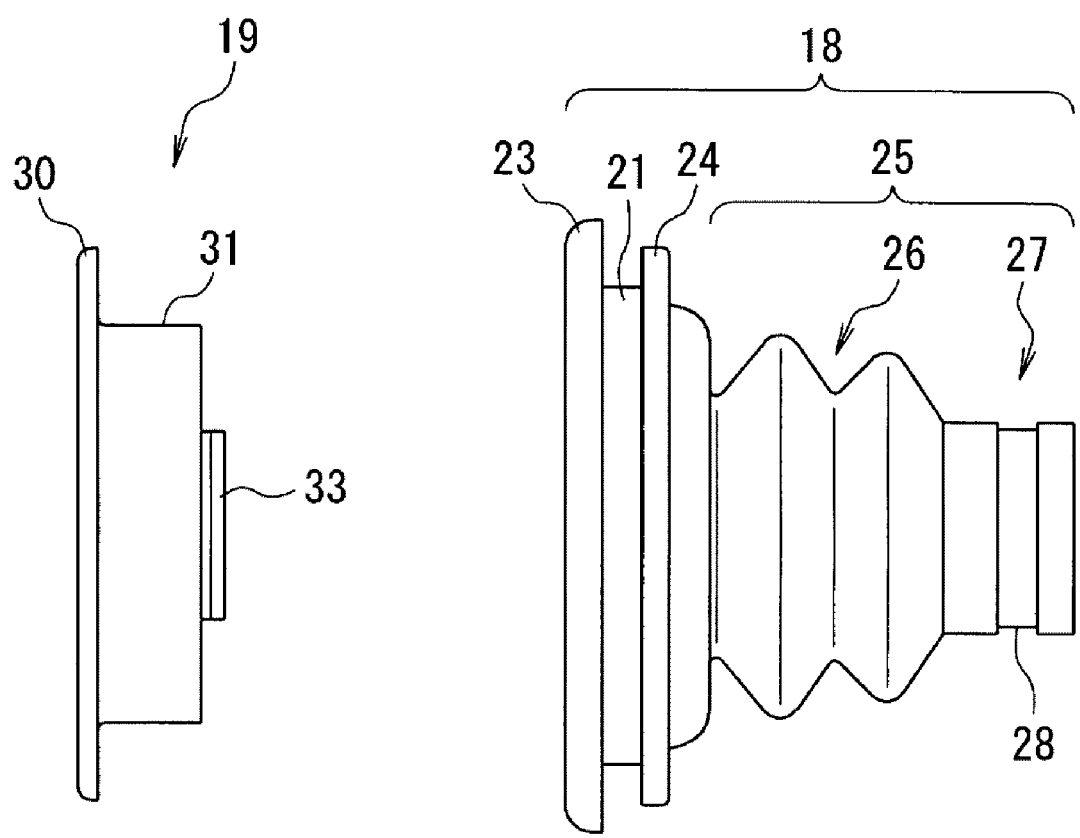
FIG. 4 shows perspective views of a rubber grommet and a resinous cap that are used for a cable insertion structure of the cowling in FIG. 3.
Figure 5A:
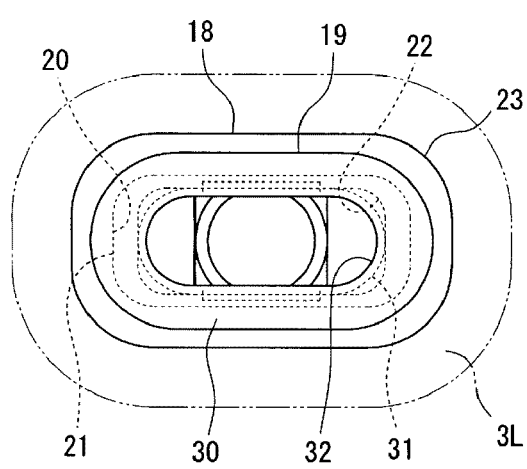
FIGS. 5A-5D illustrate the cable insertion structure with the rubber grommet and the resinous cap in FIG. 4.
Figure 5B:
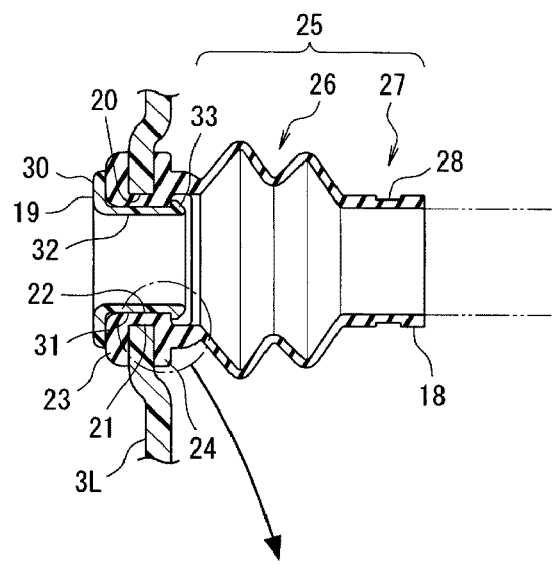
Figure 5C:
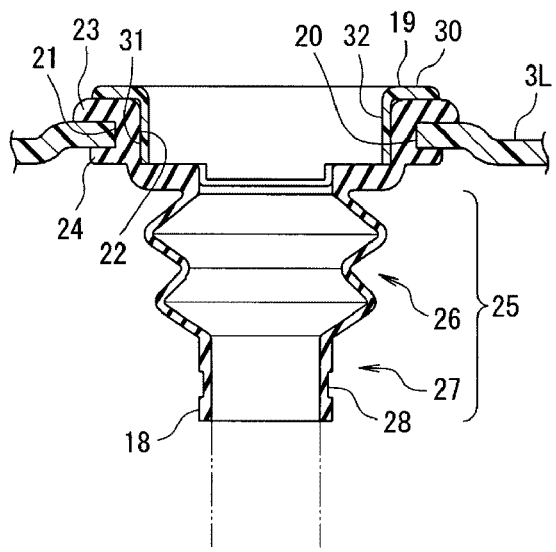
Figure 5D:
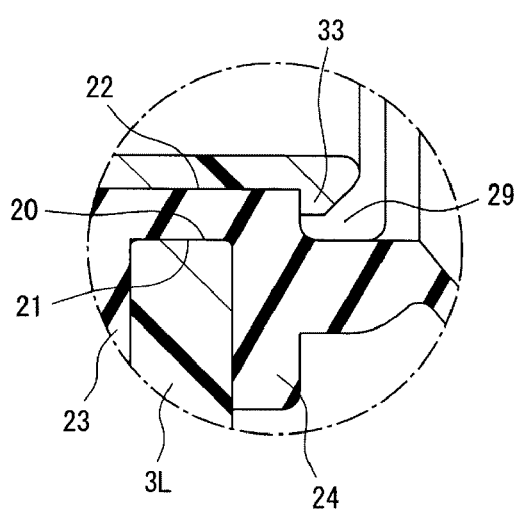

The reference numeral 18 in FIG. 3 denotes a rubber grommet to pass an electric cable in the lower cowling 3L to the outside. The rubber grommet 18 is fitted to the through hole that is formed in the lower cowling 3L. In other words, the outer casing of the outboard motor in this preferred embodiment is the lower cowling 3L. FIG. 4 shows the rubber grommet 18 and a resinous cap 19 that is fitted therein. FIGS. 5A-5D show a state where the rubber grommet 18 and the resinous cap 19 are attached to a through hole 20 of the lower cowling 3L. FIG. 5A is a front view of the rubber grommet 18 in an attached state, FIG. 5B is a vertical sectional view thereof, FIG. 5C is a transverse sectional view thereof, and FIG. 5D is a detail view of a pawl section.

The section profile of the through hole 20 in this preferred embodiment that is formed in the lower cowling 3L preferably is a rectangle with rounded corners. Thus, a communicating section 21 of the rubber grommet 18 that is tightly fitted to the through hole 20 preferably is rectangular with rounded corners in the outer section profile, and a communicating hole 22 that is formed in the communicating section 21 is also preferably rectangular with rounded corners in the section profile. An inner collar section 23 and an outer collar section 24 that respectively abut on the inner surface and the outer surface of the lower cowling 3L around the through hole 20 are provided on both sides of the communicating section 21 in an axial direction. A boot 25 that houses the cable is extended from the outer collar section 24 toward the outside of the cowling. The boot 25 preferably includes an accordion section 26 on the lower cowling 3L side and a cylindrical cable-housing section 27 that is connected to the accordion section 26 and tightly houses the cable. A groove 28 that houses a clip band is formed on the periphery of the cable housing section 27. As shown in FIG. 5D, a recess 29 in which a later-described pawl section 33 of the resinous cap 19 is fitted is formed in the long side of the rectangular section of the communicating hole 22 of the communicating section 21 on the boot 25 side.

Meanwhile, the resinous cap 19 preferably includes: a pressing section 30 arranged to abut on the inner collar section 23 of the rubber grommet 18; a supporting section 31 that extends from the pressing section 30, that is tightly fitted in the communicating hole 22 of the communicating section 21, and that includes an insertion hole 32 through which the cable is inserted; and a pawl section 33 that is located on an end of the supporting section 31 in the extending direction and that is arranged to sandwich the communicating section 21 of the rubber grommet 18 with the pressing section 30. The outer section profile of the supporting section 31 preferably is an ellipse that is tightly fitted into the communicating hole 22 of the communicating section 21 of the rubber grommet 18, and the section profile of the insertion hole 32 that is formed in the supporting section 31 preferably is also a concentric ellipse. The pawl section 33 is provided only on the end of a linear portion of the supporting section 31 with the ellipse-shaped section profile in the extending direction. The resinous cap 19 has slight flexibility.

Due to the above-described construction, in order to assemble the cable insertion structure, first the boot 25 of the rubber grommet 18 is inserted in the through hole 20 from the inside or the outside of the lower cowling 3L, then the outer collar section 24 or the inner collar section 23 is bowed by flexibility of rubber to fit the communicating section 21 in communication with the outer collar section 24 and the inner collar section 23 to the through hole 20 in the lower cowling 3L. In the above-described state, when the outer collar section 24 restores its shape due to the restoring property of rubber, the inner collar section 23 tightly abuts on the inner surface of the lower cowling 3L around the through hole 20, and the outer collar section 24 tightly abuts on the outer surface of the lower cowling 3L around the through hole 20. In addition, the periphery of the communicating section 21 is tightly fitted into the through hole 20. Thus, the rubber grommet 18 is independently fixed to the through hole 20.

Next, the pawl section 33 and the supporting section 31 of the resinous cap 19 are inserted from the inside of the cowling into the communicating hole 22 of the rubber grommet 18, and the pawl section 33 is fitted into the recess 29. Then, the communicating section 21 of the rubber grommet 18 is sandwiched between the pawl section 33 and the pressing section 30, and thus the resinous cap 19 is fixed to the rubber grommet 18. The pawl section 33 is bowed inward inside the through hole 22 by flexibility of the supporting section 31 and fitted into the recess 29 by its own restoring property when the pawl section 33 passes through the communicating hole 22.

In the above-described state, the cable is inserted from the insertion hole 32 of the resinous cap 19 into the cable housing section 27 of the rubber grommet 18. The clip band is fastened to the groove 28 of the cable housing section 27 to fix the cable housing section 27 to the cable.

Figure 6A:
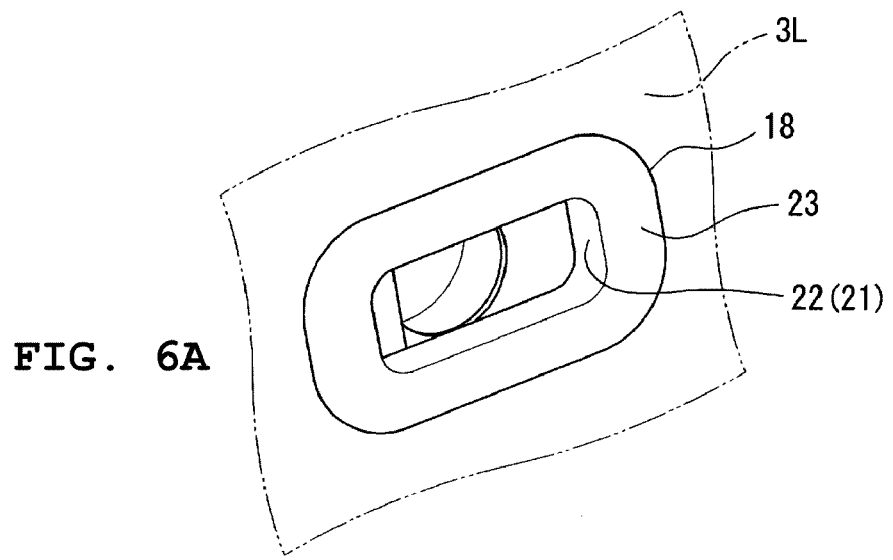
FIGS. 6A-6C illustrate deformation of the rubber grommet.
Figure 6B:
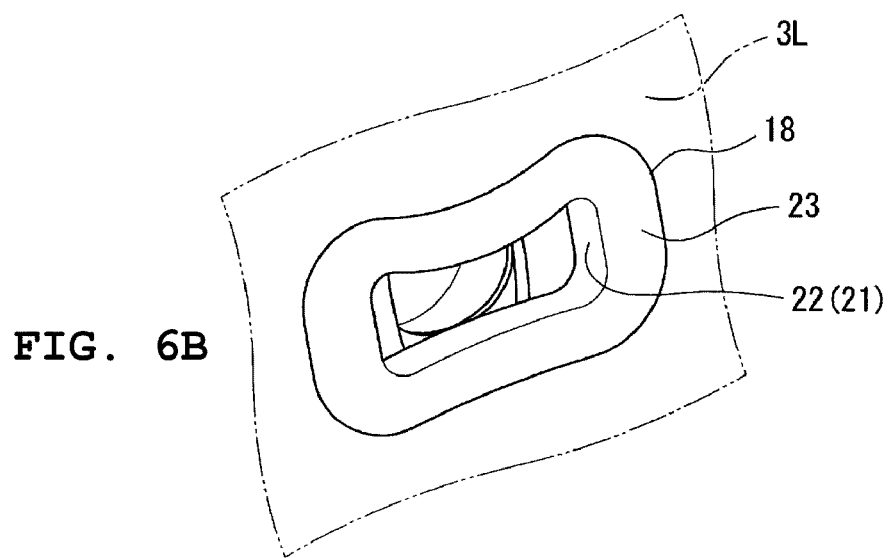
Figure 6C:
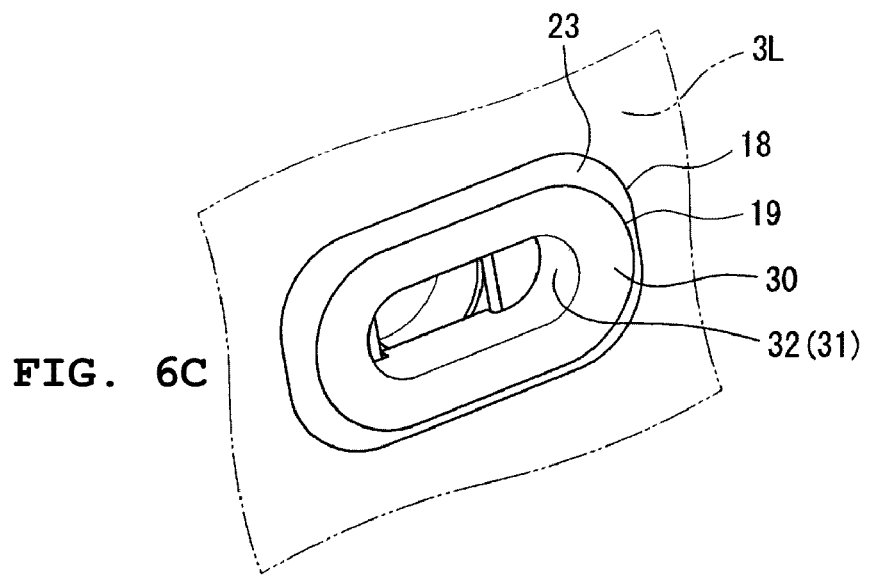

FIG. 6A shows a state in which only the rubber grommet 18 is attached to the lower cowling 3L. For example, it is supposed that the cable is directly inserted through the rubber grommet 18 and that the clip band is fastened to the groove 28 of the cable housing section 27 to fix the cable housing section 27 to the cable. If the external force that pulls the cable is applied in the above state, as shown in FIG. 6B, the communicating section 21 and the inner collar section 23 are deformed. If the external force is strong enough to cause significant deformation of the communicating section 21 and the inner collar section 23, the rubber grommet 18 may come off the through hole 20 of the lower cowling 3L, and consequently, water enters via the through hole 20. On the other hand, in this preferred embodiment in which the resinous cap 19 is also attached, as shown in FIG. 6C, the supporting section 31 of the resinous cap 19 supports the communicating section 21 of the rubber grommet 18, and the pressing section 30 presses the inner collar section 23. Accordingly, while the deformation of the communicating section 21 and the inner collar section 23 is prevented, the rubber grommet 18 is also prevented from coming off the through hole 20. Therefore, it is possible to prevent water immersion via the through hole 20.

According to the cable insertion structure for an outboard motor in this preferred embodiment, in order to insert the cable through the lower cowling 3L of the outboard motor via the rubber grommet 18, the rubber grommet 18 preferably includes: the communicating section 21 that is tightly fitted to the through hole 20 located in the lower cowling 3L and that includes the communicating hole 22 that is in communication with the inner and outer surfaces of the lower cowling 3L; the inner collar section 23 that tightly abuts on the inner surface of the lower cowling 3L around the through hole 20 on both sides of the communicating section 21; and the outer collar section 24 that tightly abuts on the outer surface of the lower cowling 3L around the through hole 20 on both sides of the communicating section 21. The resinous cap 19 preferably includes: the pressing section 30 that abuts on the inner collar section 23 of the rubber grommet 18; the supporting section 31 that extends from the pressing section 30, that is tightly fitted in the communicating hole 22 of the communicating section 21 of the rubber grommet 18, and that includes the insertion hole 32 through which the cable is inserted; and the pawl section 33 that is located on the end of the supporting section 31 in the extending direction to sandwich the communication section 21 of the rubber grommet 18 with the pressing section 30. The resinous cap 19 is inserted in the communicating hole 22 of the communicating section 21 of the rubber grommet 18 to fix the rubber grommet 18 to the lower cowling 3L, and the cable is inserted through the insertion hole 32 of the resinous cap 19. Thus, the communicating section 21 of the rubber grommet 18 is pressed against the inside of the through hole 20 of the lower cowling 3L by the supporting section 31 of the resinous cap 19 while the inner collar section 23 of the rubber grommet 18 is pressed by the pressing section 30 of the resinous cap 19. Therefore, it is possible to prevent the rubber grommet 18 from coming off the through hole 20 even when the external force that pulls the cable is applied, and thus to prevent water immersion via the through hole 20.

The communicating hole 22 of the rubber grommet 18 preferably has a rectangular or nearly rectangular shape in its inner section profile while the supporting section 31 of the resinous cap 19 preferably has an ellipse shape in its outer section profile that is tightly fitted to at least the short side of the communicating hole 22. Thus, the cable generally with a round cross section can be guided smoothly. In addition, the communicating section 21 of the rubber grommet 18 is efficiently pressed against the inside of the through hole 20 of the lower cowling 3L to prevent the deformation of the communicating section 21. Therefore, it is possible to reliably prevent the rubber grommet 18 from coming off the through hole 20 when the external force that pulls the cable is applied.

The pawl section 33 is formed on the end of the long side of the ellipse-shaped supporting section 31 in the extending direction. Therefore, it is possible to increase the strength of the supporting section 31, especially the portion in the long side of the ellipse-shaped supporting section 31.

An outboard motor to which the cable insertion structure for an outboard motor according to the present invention is not limited to the one that is described in the above preferred embodiments. Similarly, a watercraft to which the cable insertion structure for an outboard motor according to the present invention is applied is not limited to the one described in the above preferred embodiments.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A cable insertion structure arranged to allow a cable to be inserted through an outer casing of an outboard motor, the cable insertion structure comprising:
    a grommet; and
    a cap arranged to fix the grommet to the outer casing; wherein
    the grommet includes:
        a communicating section tightly fitted into a through hole provided in the outer casing and that includes a communicating hole arranged to communicate with inner and outer surfaces of the outer casing;
        an inner collar section arranged to tightly abut on the inner surface of the outer casing around the through hole on both sides of the communicating section; and
        an outer collar section arranged to tightly abut on the outer surface of the outer casing around the through hole on both sides of the communicating section; and
    the cap includes:
        a pressing section arranged to abut on the inner collar section of the grommet;
        a supporting section arranged to extend from the pressing section, that is tightly fitted into the communicating hole of the communicating section, and that includes an insertion hole through which the cable is inserted; and
        a pawl section located on an end of the supporting section in an extending direction and arranged to sandwich the communicating section of the grommet with the pressing section.

2. The cable insertion structure for an outboard motor according to claim 1, wherein the communicating hole of the grommet is rectangular or nearly rectangular in inner section profile, and the supporting section of the rubber cap has an ellipse shape in outer section profile that is tightly fitted to at least a short side of the communicating hole.

3. The cable insertion structure for an outboard motor according to claim 2, wherein the pawl section is located on an end of the ellipse-shaped supporting section in a long side in the extending direction.

4. The cable insertion structure for an outboard motor according to claim 1, wherein the grommet is made of rubber.

5. The cable insertion structure for an outboard motor according to claim 1, wherein the cap is made of a resinous material.

* * * * *